Feb. 27, 1951     C. L. LONGMIRE     2,543,462
PULSE EQUALIZER
Filed Oct. 19, 1945
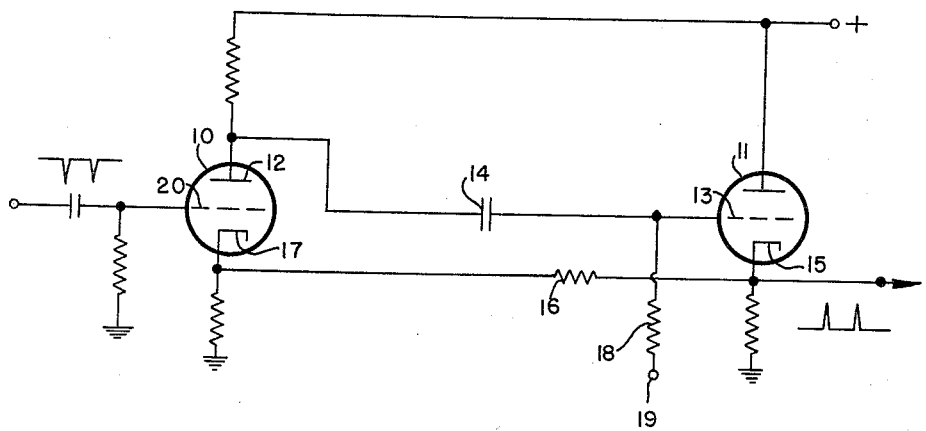
INVENTOR.
CONRAD L. LONGMIRE
BY
*William D. Hall.*
ATTORNEY Patented Feb. 27, 1951

2,543,462

UNITED STATES PATENT OFFICE 2,543,462

PULSE EQUALIZER

Conrad L. Longmire, Boston, Mass., assignor, by mesne assignments, to the United States of America as represented by the Secretary of War Application October 19, 1945, Serial No. 623,403

4 Claims. (Cl. 178—44)

This invention relates generally to electrical circuits and more particularly to pulse-equalizing circuits.

It is often desirable to provide a circuit which will produce pulses of substantially equal amplitude when pulses of varying amplitude are applied to the input. One such instrument in which this is desirable is in radio beacon circuits.

In one method of obtaining pulses of substantially equal amplitude from a source of pulses of unequal amplitude, unequal negative pulses are applied to the grid of a vacuum tube, the grid being biased slightly above cut-off. The output positive pulses thus developed at the plate of the tube are of substantially equal amplitude, the only requirement being that each of the input pulses be of sufficient amplitude to cut off the tube for the duration of the pulse. Such a circuit is known as a clipper.

In another method of obtaining substantially equal output pulses, positive unequal pulses are applied to a vacuum tube which is normally operating slightly below the saturation point. The output pulses at the plate of the tube will be negative pulses of substantially equal amplitude, the only requirement being that the input pulses be of sufficient amplitude to cause the tube to operate in the saturation region. This circuit is known as a limiter.

The most important disadvantage of the above methods is that the amplitude of the input pulses must be greater than a critical value or the equalizing effect will not take place.

It is an object, therefore, of this invention to provide a circuit which will substantially eliminate the recited disadvantage of the above-mentioned circuits.

It is a further object of this invention, therefore, to provide a circuit which will produce pulses of substantially equal amplitude at the output when pulses of unequal amplitude are applied to the input.

Other object, features, and advantages of this invention will suggest themselves to those skilled in the art and will become apparent from the following description of the invention taken in connection with the accompanying drawing in which the sole figure is a circuit diagram of one embodiment of the invention.

Referring now to the drawing, the circuit consists of vacuum tube 10 which is connected as an amplifier, and vacuum tube 11 which is connected as a cathode follower. The output of tube 10 is taken from plate 12 and applied to grid 13 of tube 11 through coupling capacitor 14. The output of tube 11 is taken at cathode 15 and fed back through resistor 16 to cathode 17 of tube 10. Grid 13 is returned through grid resistor 18 to a proper negative bias which is applied at terminal 19. Output of the circuit is taken at cathode 15 of tube 11.

In operation, negative pulses of unequal amplitude are applied to grid 20 of vacuum tube 10 causing corresponding unequal amplitude positive pulses to appear at plate 12. The positive pulses are applied to grid 13 through capacitor 14. The cathode follower 11 output, which is also a series of positive pulses, is taken at cathode 15 and fed back to cathode 17 through resistor 16. The action is regenerative and the plate 12 (of tube 10) and grid 13 (of tube 11) are caused normally to rise in potential until the saturation point of tube 11 is reached. After the saturation point is reached, no further increase in plate current of tube 11 can be made. Therefore the output of the circuit taken at cathode 15 consists of positive pulses of substantially equal amplitude.

It will be seen that the circuit herein set forth will accept pulses of varying amplitudes and produce an output of pulses of substantially equal amplitude. It will also be seen that this circuit is not critical as to amplitude of input pulses.

While there has been described what is at present considered to be the preferred embodiment of this invention, it will be obvious to those skilled in the art that various changes and modifications may be made therein without departing from the scope of the invention as set forth in the appended claims, and I claim all such changes and modifications as fall fairly within the spirit and scope thereof. As an example thereof, in practice, an inductance is used in the cathode circuit of the amplifier instead of a resistor as shown to sharpen the pulse and thereby make the regenerative action thereof more rapid. This has been found to be advantageous.

What I claim is:

1. In a circuit for producing pulses of substantially equal amplitude from a source of negative pulses of varying amplitude, a vacuum tube amplifier circuit coupled to said source and having a cathode-ground circuit, a vacuum tube cathode follower circuit connected to the output of said amplifier circuit, and means for saturating said cathode follower during the impression of each pulse on said amplifier, said means comprising means for coupling the output of said cathode follower circuit to the cathode-ground circuit of said amplifier circuit, the parameters of said amplifier circuit and cathode follower circuit being such that said amplifier circuit drives said cathode follower circuit to plate current saturation and said cathode follower circuit reduces but does not cut off the plate current of said amplifier circuit, whereby pulses of substantially equal amplitude appear at the cathode of said cathode follower.

2. In a circuit for producing pulses of substantially equal amplitude from a source of negative pulses of varying amplitude, a vacuum tube amplifier circuit coupled to said source having a positive pulse output, a vacuum tube cathode follower circuit connected to the output of said amplifier circuit, and means for saturating said cathode follower during the impression of each pulse, said means comprising means for regeneratively coupling the output of said cathode follower circuit to the said amplifier circuit so that said cathode follower at saturation reduces but does not cut off the plate current of said amplifier circuit, whereby pulses of substantially equal amplitude appear at the cathode of said cathode follower.

3. In a circuit for producing pulses of substantially equal amplitude from a source of negative pulses of varying amplitude, a first vacuum tube amplifier circuit coupled to said source having a positive pulse output, a second vacuum tube amplifier circuit connected to the output of said first amplifier circuit, and means for saturating said second amplifier circuit during the time of impression of said pulses on said first amplifier, said means comprising means for coupling the output of said second amplifier circuit in a regenerative manner to the said first amplifier circuit and means for utilizing the output of said second amplifier only whereby pulses of substantially equal amplitude appear at the output of said second amplifier circuit.

4. In combination, a source for producing negative pulses of unequal amplitude, an amplifier circuit connected to said source having a positive pulse output, a cathode follower circuit connected to receive the positive pulse output of said amplifier circuit, and means for saturating said cathode follower during the negative pulse input to said amplifier, said means comprising means for coupling the output of said cathode follower circuit to said amplifier circuit in phase with said pulse input so that the positive pulse output of said amplifier circuit impressed on said cathode follower circuit is sufficiently large to cause saturation of said cathode follower circuit, whereby pulses of substantially equal amplitude appear at the output of said cathode follower.

CONRAD L. LONGMIRE.

REFERENCES CITED

The following references are of record in the file of this patent:

UNITED STATES PATENTS

| Number | Name | Date |
|---|---|---|
| 2,208,422 | Hugon | July 16, 1940 |
| 2,256,085 | Goodale | Sept. 16, 1941 |
| 2,276,565 | Crosby | Mar. 17, 1942 |
| 2,368,454 | Dome | Jan. 30, 1945 |
| 2,373,534 | Broos | Apr. 10, 1945 |
| 2,398,596 | Price | Apr. 16, 1946 |